US008456568B2

(12) United States Patent
Wendt

(10) Patent No.: US 8,456,568 B2
(45) Date of Patent: Jun. 4, 2013

(54) ILLUMINATION DEVICE WITH IMPROVED REMOTE CONTROL

(75) Inventor: Matthias Wendt, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 284 days.

(21) Appl. No.: 12/988,013

(22) PCT Filed: Apr. 17, 2009

(86) PCT No.: PCT/IB2009/051599

§ 371 (c)(1), (2), (4) Date: Oct. 15, 2010

(87) PCT Pub. No.: WO2009/130644

PCT Pub. Date: Oct. 29, 2009

(65) Prior Publication Data

US 2011/0267525 A1 Nov. 3, 2011

(30) Foreign Application Priority Data

Apr. 23, 2008 (EP) .................................... 08103684

(51) Int. Cl.
*H04N 5/222* (2006.01)

(52) U.S. Cl.
USPC .......................................... 348/370; 362/304

(58) Field of Classification Search
USPC ............... 348/172, 207.99, 333.01, 335, 370, 348/371, 217.1; 340/953; 382/103; 362/296.01, 362/16, 304; 359/721; 600/478
See application file for complete search history.

(56) References Cited

U.S. PATENT DOCUMENTS 2,675,462 A * 4/1954 Newton .......................... 362/16
4,868,567 A * 9/1989 Eichweber .................... 340/953
5,023,709 A 6/1991 Kita et al.
5,051,830 A * 9/1991 von Hoessle ................. 348/335
5,828,485 A 10/1998 Hewlett
6,079,862 A * 6/2000 Kawashima et al. ......... 382/103
7,230,752 B2 6/2007 Hewlett et al.
2002/0195561 A1* 12/2002 Bacarella et al. ............. 250/330
2003/0058631 A1 3/2003 Yoneda
2003/0230707 A1* 12/2003 Hogan et al. ............ 250/214 VT (Continued)

FOREIGN PATENT DOCUMENTS

GB 1393794 A 5/1975
JP 10012005 A 1/1998

(Continued)

*Primary Examiner* — Nelson D. Hernández Hernández
*Assistant Examiner* — Dennis Hogue
(74) *Attorney, Agent, or Firm* — Mark L. Beloborodov

(57) ABSTRACT

The present invention relates to an illumination device comprising at least one light source and a reflector system forming a spotlight (1), one or several actuators (5) arranged to pivot the spotlight (1) relative in a mounting base (4) for varying an illumination angle, and a camera (13) attached to the spotlight (1) and aligned to acquire images of an illumination region (7) to which the spotlight (1) is directed. The spotlight (1) is designed to comprise a central region from which the illumination region (7) is visible and which does not reflect or emit light of the light source towards the illumination region (7), wherein the camera (13) is arranged in said central region on an optical axis (14) of the spotlight (1). With the proposed illumination device an exact aiming of the spotlight (1) can be achieved even in applications in which the illuminated region (7) is close to the spotlight (1) without causing undesired shadows in the illumination region (7).

12 Claims, 2 Drawing Sheets

U.S. PATENT DOCUMENTS

| | | | | |
|---|---|---|---|---|
| 2003/0231245 | A1* | 12/2003 | Bacarella et al. | 348/217.1 |
| 2004/0178750 | A1 | 9/2004 | Belliveau | |
| 2008/0214940 | A1* | 9/2008 | Benaron et al. | 600/478 |
| 2009/0052189 | A1* | 2/2009 | Kon | 362/296.01 |
| 2009/0135502 | A1* | 5/2009 | Border et al. | 359/721 |

FOREIGN PATENT DOCUMENTS

| | | | |
|---|---|---|---|
| WO | 9820277 | A1 | 5/1998 |
| WO | 0106335 | A2 | 8/2001 |
| WO | 2006075298 | A2 | 7/2006 |

* cited by examiner

ILLUMINATION DEVICE WITH IMPROVED REMOTE CONTROL

FIELD OF THE INVENTION

The invention relates to an illumination device comprising at least one light source and a reflector system forming a spotlight, one or several actuators arranged to pivot the spotlight in a mounting base for varying an illumination angle of a light beam emitted by said spotlight and a camera attached to the spotlight and aligned to acquire images of an illumination region to which the spotlight is directed.

Illumination devices of this kind are used in many applications in which an object or a scene must be illuminated, in particular in order to accentuate the object or scene compared to the surroundings. A preferred application of the illumination device described in this patent is display lighting for stores in which the object or region to be accentuated is closer to the spotlight than in theaters, on stages or in studio lighting.

BACKGROUND OF THE INVENTION

Illumination devices comprising a light source and a reflector system forming a spotlight and one or several actuators arranged to pivot the spotlight in a mounting base for varying an illumination angle of the light beam emitted by the spotlight are known as moving head lamps or as robotic lamps. Robotic lamps comprise rather small actuation motors which are in contrast to the motors in moving head lamps lower in cost and much slower in actuation. Therefore, robotic lamps can be installed in a high number and allow aiming of the emitted light beam without the need for climbing a ladder for the light designer. The actuation motors are simply connected through wire or wirelessly to a control station at which the light designer can control the pivoting of the spotlights.

U.S. Pat. No. 6,079,862 A describes an automatic tracking lighting equipment for automatically tracking a target to be illuminated. The spotlight is supported for pivoting in horizontal and vertical directions on a ceiling surface. A horizontal drive mechanism changes the horizontal angle of the spotlight and a vertical drive mechanism changes the vertical angle of the spotlight. A CCD camera is attached to the housing of the spotlight and picks up the image of a target area to be illuminated. The target to be illuminated is recognized by an image recognition unit which processes the image from the CCD camera. According to the calculated coordinates of the target, the driving mechanisms are automatically driven to pivot the spotlight in a desired direction.

Such an illumination device is applicable without severe problems in applications in which the size of the spotlight and the generated lighting effect are small compared to the distance between the spotlight and the target surface. This is mostly the case in theaters, on stages or in studio lighting. This is not the case in the field of display lighting for stores in which the target regions are closer to the spotlight. In these applications, parallax errors between the spotlight and the camera axis reduce the accuracy of the aiming. Positioning the camera on the optical axis of the spotlight on the other hand produces undesired shadows in the illuminated target region.

SUMMARY OF THE INVENTION

It is an object of the present invention to provide an illumination device with improved remote control of the illumination angle, which allows an exact control without undesired shadows in the illumination region.

The object is achieved with the illumination device according to claim 1. Advantageous embodiments of the illumination device are subject matter of the dependent claims or are disclosed in the subsequent portions of the description and the embodiments.

The proposed illumination device comprises at least one light source and a reflector system forming a spotlight, one or several actuators arranged to pivot the spotlight in a mounting base for varying an illumination angle of the light beam emitted by the spotlight, and a camera attached to the spotlight and aligned to acquire images of an illumination region to which the spotlight is directed. The spotlight is designed to comprise a central region from which the illumination region is visible and which does not reflect or emit light of the light source towards the illumination region, wherein the camera is arranged in said central region on the optical axis of the spotlight. The central region preferably faces the illumination region. The reflector system of such a spotlight is designed to avoid any central shadow in the illuminated region.

By using such a special design of the spotlight the camera can be arranged on the optical axis of the spotlight without causing any shadows in the projected region. By placing the camera on the optical axis in such a way no parallax errors can occur, allowing a more exact aligning or aiming of the spotlight. The camera can be designed or adjusted to acquire an image of an imaging region which has the same dimensions than the region illuminated by the spotlight. If this illumination region has a circular form the image can for example be masked to exactly coincide in the size and form with the illumination region. The camera can also be designed or adjusted to acquire an image of a larger imaging region than the size of the illumination region in order to provide an overview over the closer surroundings of the illumination region.

With the proposed illumination device manual, semi manual and automatic operation of the control system for controlling the actuators of the spotlight can be achieved. In any case the camera gets aimed together with the spotlight. The image of the camera, which may be for example a CCD or CMOS camera, shows the light reflected from illuminated surface. In a manual operation the designer can for example look at the image acquired by the camera and control the actuators of the spotlight via a graphical user interface of the control station to achieve the correct orientation of the spotlight for the desired illumination. In such a case, normally the center of the acquired image corresponds to the center of the illuminated region. It is also possible to use the graphical user interface to point at a position in the acquired image, which in this case must show a larger area than the size of the illuminated region. In this case, the actuators are automatically controlled to center the image, i.e. to move the spotlight to the desired target region. Furthermore, an image recognition algorithm can be used to detect the desired target object or target region in the image, wherein the actuators are then also controlled automatically to align the spotlight accordingly. Such an automatic or semi automatic recognition, an example of which is described in the above mentioned U.S. Pat. No. 6,079,862 A, can be applied with the proposed illumination device accordingly.

The acquired image data can be sent from the camera to the control station wirelessly or through wire. The same applies for the control signals for driving the actuators to pivot the spotlight. Furthermore, the mechanical construction for moving the spotlight is not critical. Any known construction able to move the spotlight in desired directions, in particular by pivoting the spotlight in one or two dimensions, can be used. Preferably the actuators are small actuator motors as known from robotic lamps. The light sources of the illumination device can be formed of one or several LED's (LED: light emitting diode) or from UHP lamps (UHP: ultra high performance). If available, also other light sources suitable for the desired illumination application can be used. This applies to all kinds of light sources which allow that their light can be focused by a reflector system for forming an illumination light beam. Due to the small burning point for efficient beam focus UHP lamps are especially advantageous with the proposed illumination device.

In one embodiment of the proposed device, the light source is formed of several LEDs of different color, the emitted light of which is mixed by a mixing system. By varying control of the several LEDs such a light source can emit light of controlable color to produce interesting lighting effects.

In an advantageous embodiment the reflector system of the proposed illumination device is formed of a catadioptric or catoptric optics comprising on its optical axis a first reflective element with a central opening and a second reflective element. The second reflective element is smaller than the first reflective element and designed and arranged to reflect light of the light source entering along the optical axis through the opening from the back side of the first reflective element to the reflecting surface of the first reflective element. From this reflecting surface of the first reflective element the light is reflected towards the illumination region. The reflecting surface of the first reflective element is curved in order to provide a collimating effect to the impinging light. The two reflecting elements are designed to avoid any central shadow by the second reflective element in the illuminated region. Such catadioptric or catoptric optics is known in the art, for example from the field of telescopes. The camera is mounted on the back side of the second reflective element and therefore does also not cause any shadow in the illumination region. The second reflective element may also be curved or may be planar, dependent on the optical construction of the whole reflector system. The use of such catadioptric or catoptric optics has the further advantage that the light source is placed behind the first reflective element, also called main reflector, and therefore does not have severe restrictions in dimension. Therefore, a light source composed of several LEDs and a mixing unit for mixing the light of the LEDs may be arranged as the light source behind the main reflector.

It is also possible to interchange the positions of the camera and the light source in the above system, i.e. to arrange the camera behind the first reflective element and to arrange the light source on the back side of the second reflective element. The back side of the second reflective element in this case must be designed to collimate and reflect the light of the light source towards the illumination region.

In a further advantageous embodiment, the reflector system is formed of a parabolic reflector comprising a central mounting rod for the light source. The light source or several light sources in this case are mounted on the side face of this central mounting rod, wherein the camera is mounted on the top of this mounting rod.

In a further preferred embodiment, the spotlight is designed such that the light source and at least one reflector element of the reflector system are movable relative to each other to enlarge or reduce their distance on the optical axis. With such a relative movement the aperture angle of the light beam emitted by the spotlight and with this aperture angle the size of the illuminated area can be varied. The actuators are preferably motor driven actuators which are controlled by the control station. Furthermore, the camera comprises an optical system, in particular a zoom system, which is also adjustable by one or several appropriate actuators. With such an adjustable optics the angle of view of the camera can also be enlarged or reduced by control of the actuators through the control station. Preferably, the actuation of the actuators for varying the illumination aperture are coupled to the actuators for actuating the zoom optics such that all actuators are driven simultaneously and that the illumination region always coincides in size and position with the imaging region. Therefore, for aiming the spotlight, it is not necessary that the light sources are operated, since the image acquired by the camera is always identical to the illuminated region.

These and other aspects of the invention will be apparent from and elucidated with reference to the embodiments described hereinafter.

BRIEF DESCRIPTION OF THE DRAWINGS

The following exemplary embodiments show examples of the proposed illumination device and components thereof with reference to the accompanying figures without limiting the scope of protection.

The figures show.

DETAILED DESCRIPTION OF EMBODIMENTS

Figure 1:
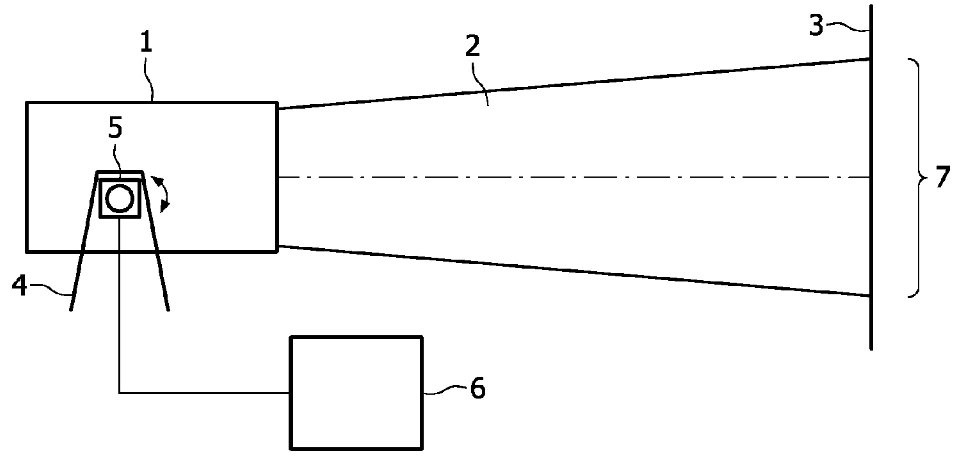
FIG. 1 a schematic view of an illumination device with remote control.

FIG. 1 is a schematic view of an illumination device which may be internally designed according to the present invention. The figure shows the housing of a spotlight 1 which emits a light beam 2 to illuminate an illumination region 7, in this case on a wall 3. The spotlight 1 is mounted on a mounting base 4 to be pivotable in the direction of the arrow in FIG. 1 relative in this mounting base 4. An actuation motor 5 can be driven by a control station 6 to pivot the spotlight in the mounting base 4.

Figure 2:
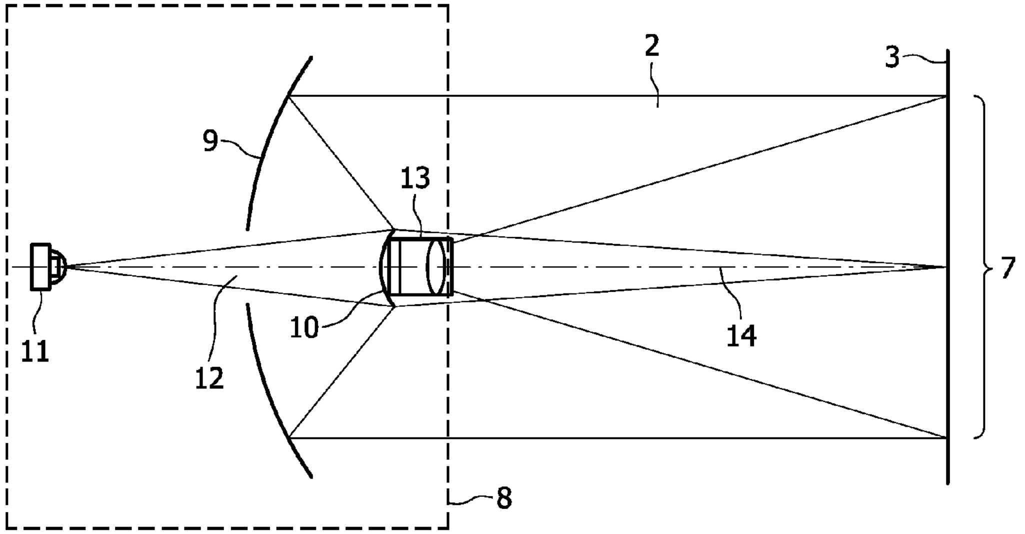
FIG. 2 a schematic view of a first example of the proposed illumination device.

FIG. 2 shows a first example of the reflector system of the illumination device of the present invention. The reflector system in this example is formed of a catadioptric optics comprising a curved main reflector 9 and a curved secondary reflector 10 arranged as indicated in FIG. 2. The light emitted by the LED light source 11 is directed through an opening 12 in the main reflector 9 to the reflecting surface of the secondary reflector 10. From this reflecting surface the light is directed back to the reflecting surface of the main reflector 10 which reflects and collimates the light towards the wall 3 to form the illumination region 7 without shadows. A lens or lens system between the LED light source 11 and the opening 12 is not shown in the figure. Such a lens or lens system may also be omitted dependent on the characteristics of the light source. On the non-reflecting back side of the secondary reflector 10 the camera 13 is mounted on the optical axis 14 of the spotlight to acquire images including the illumination region 7. The angle of view of the camera 13 for imaging may be adjustable by a zoom optics indicated schematically as a lens inside of the camera 13. The whole reflector system and light source are arranged inside of the housing 8 of the spotlight 1. Since the camera 13 is mounted at the spotlight 1 such that it gets aimed together with the spotlight, the image acquired by the camera 13 and displayed at the control station 6 shows the light of the spotlight 1 reflected from illumination region 7.

Figure 3:
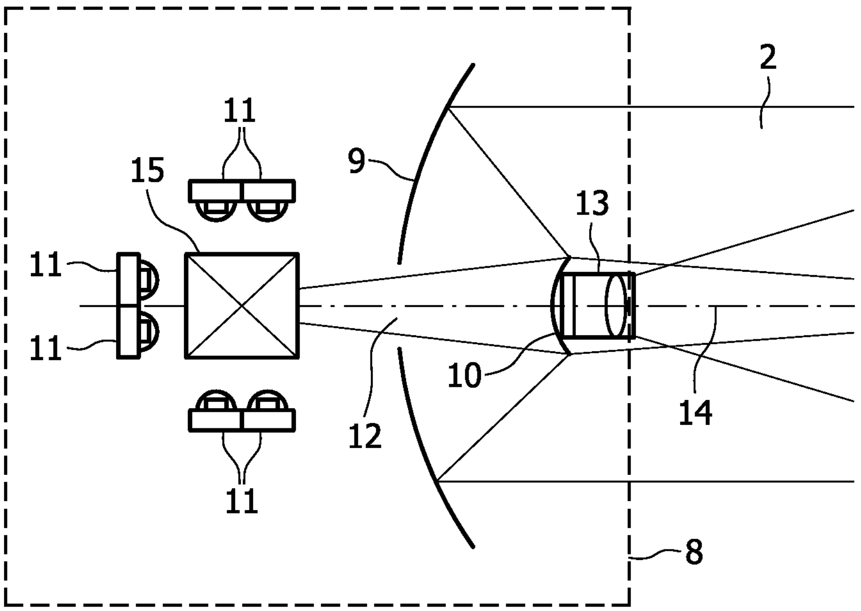
FIG. 3 a schematic view of a second example of the proposed illumination device.

Instead of the single LED light source 11, multiple LEDs 11 may form the light source together with a mixing system 15 for mixing the light emitted by the LED light sources 11 to form one mixed light beam. Using LEDs of different color with such a mixing system 15, by appropriate control of the single LED light sources 11 the color of the emitted light can be controllable varied. Since such a light source requires some space the use of a catadioptric or catoptric optics as shown in FIG. 3 is advantageous since the light source may be arranged behind the main reflector 9 without dramatically growing the lamp housing 8.

Figure 4:
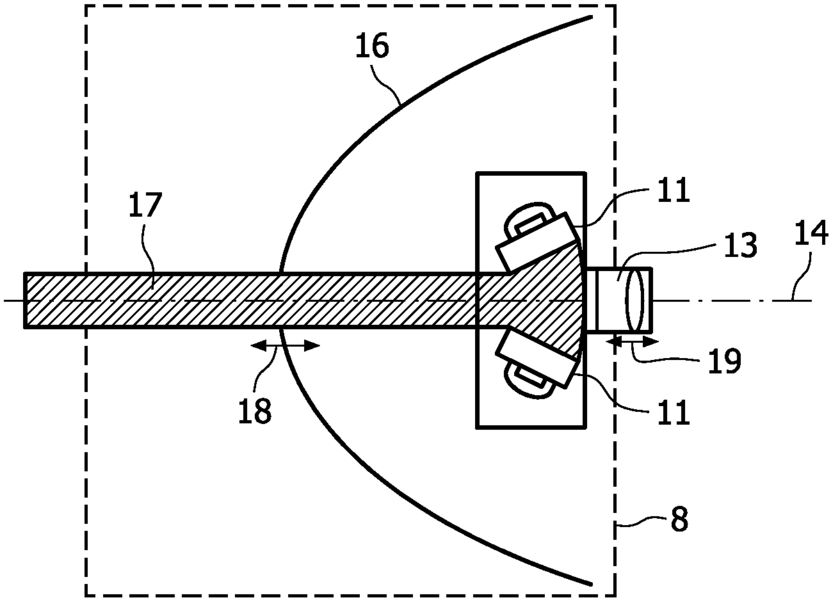
FIG. 4 a schematic view of a third example of the proposed illumination device.

FIG. 4 shows a further embodiment of the proposed illumination device. The reflector system of this device comprises a parabolic reflector 16. The camera 13 is placed on top of the mounting rod 17 carrying the LED light sources 11 for illumination.

FIG. 4 shows two arrows 18, 19 which indicate the possibility of a relative movement of the mounting rod 17 relative to the reflector 16 and of lenses of a zoom optics arranged inside of the camera 13. With the relative movement between the mounting rod 17 and the parabolic reflector 16 a light beam aperture angle adjustment can be achieved. This relative movement may be performed by an appropriate motoric actuator which is controllable by the control station. In the same manner the zoom optics of the camera 13 may be adjusted by appropriate actuating means via the control station. By synchronously adjusting the zoom optics of the camera 13 when the parabolic mirror 16 and the mounting rod 17 are moved relative to each other, the movements can be coupled such that the camera 13 always shows exactly the part of the scene that gets illuminated.

While the invention has been illustrated and described in detail in the drawings and foregoing description, such illustration and description are to be considered illustrative or exemplary and not restrictive. The invention is not limited to the disclosed embodiments. The different embodiments described above and in the claims can also be combined. Other variations to the disclosed embodiments can be understood and effected by those skilled in the art in practicing the claimed invention, from the study of the drawings, the disclosure and the appended claims. For example, the construction of the reflector system is not limited to the exemplary construction in the figures. The same applies to the design of the light source, which may comprise another arrangement of LEDs or other types of light emitting devices. The reflecting surfaces may also be based on total reflection.

In the claims, the word "comprising" does not exclude other elements or steps, and the indefinite article "a" or "an" does not exclude a plurality. The mere fact that measures are recited in mutually different dependent claims does not indicate that a combination of these measures can not be used to advantage. The reference signs in the claims should not be construed as limiting the scope of these claims.

LIST OF REFERENCE SIGNS

1 spotlight
2 light beam
3 wall
4 mounting base
5 actuation motor
6 control station
7 illumination region
8 housing
9 main reflector
10 secondary reflector
11 LED light source
12 opening
13 camera
14 optical axis
15 mixing system
16 parabolic reflector
17 mounting rod
18 arrow
19 arrow

The invention claimed is:

1. An illumination device comprising at least one light source and a reflector system forming a spotlight, one or several actuators arranged to pivot the spotlight in a mounting base for varying an illumination angle of a light beam emitted by said spotlight, and a camera attached to the spotlight and aligned to acquire images of an illumination region to which the spotlight is directed, wherein said spotlight is designed to comprise a central region from which the illumination region is visible and which does not reflect or emit light of the light source towards the illumination region, said camera being arranged in said central region on an optical axis of the spotlight, and wherein said reflector system is formed of a parabolic reflector comprising a central mounting rod which carries the at least one light source on a side face, said camera being arranged on a top of the mounting rod.

2. The device according to claim 1, wherein said actuators are controllable via a control station distant from said spotlight.

3. The device according to claim 2, wherein said camera is connected through wire or wirelessly to a monitor for displaying the images of the illumination region.

4. The device according to claim 3, wherein said control station comprises a graphical user interface to allow a user to mark a point or region of interest in said images and wherein said actuators are automatically controlled by said control station to aim the spotlight at the point or region of interest.

5. The device according to claim 1, wherein said light source comprises several LEDs of different color and a mixing system for mixing light emitted by the LEDs before impinging on said reflector system.

6. The device according to claim 1, wherein the light source and at least a main reflection element of the reflection system are movable relative to each other along the optical axis for varying an aperture angle of the light beam emitted by the spotlight, wherein the camera comprises an optical system adjustable to vary an angle of view of the camera, and wherein said relative movement of the light source and the main reflection element and said adjustment of the optical system of the camera are coupled to be performed synchronously such that the illumination region always coincides with a region imaged by the camera.

7. The device according to claim 6, wherein the spotlight comprises one or several electrically driven actuators for performing the relative movement of the light source and the main reflection element and wherein the camera comprises one or several electrically driven actuators for adjusting the optical system.

8. An illumination device comprising:

at least one light source and a reflector system forming a spotlight, one or several actuators arranged to pivot the spotlight in a mounting base for varying an illumination angle of a light beam emitted by said spotlight, and a camera attached to the spotlight and aligned to acquire images of an illumination region to which the spotlight is directed, wherein said spotlight comprises a central region from which the illumination region is visible and which does not reflect or emit light of the light source towards the illumination region, said camera being arranged in said central region on an optical axis of the spotlight, wherein the light source and at least a main reflection element of the reflection system are movable relative to each other along the optical axis for varying an aperture angle of the light beam emitted by the spotlight, wherein the camera comprises an optical system adjustable to vary an angle of view of the camera, and wherein said relative movement of the light source and the main reflection element and said adjustment of the optical system of the camera are coupled to be performed synchronously such that the illumination region always coincides with a region imaged by the camera.

9. The device according to claim 8, wherein said actuators are controllable via a control station distant from said spotlight.

10. The device according to claim 9, wherein said camera is connected through wire or wirelessly to a monitor for displaying the images of the illumination region.

11. The device according to claim 9, wherein said control station comprises a graphical user interface to allow a user to mark a point or region of interest in said images and wherein said actuators are automatically controlled by said control station to aim the spotlight at the point or region of interest.

12. The device according to claim 8, wherein said light source comprises several LEDs of different color and a mixing system for mixing light emitted by the LEDs before impinging on said reflector system.

* * * * *